July 31, 1928.
H. S. FRIES
MILK STRAINER
Filed May 14, 1926
1,679,122
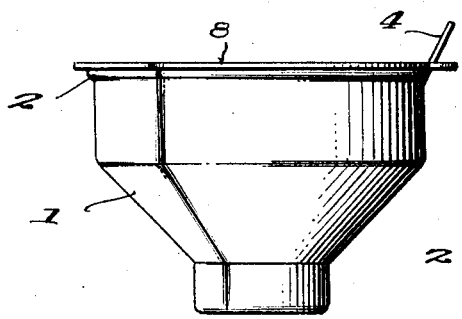
Fig. 1.
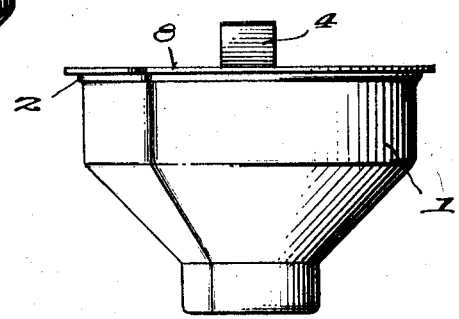
Fig. 4.
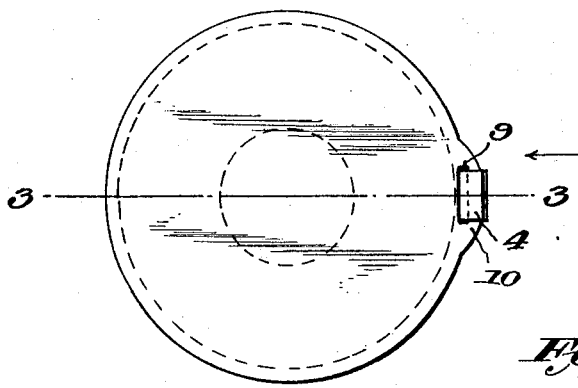
Fig. 2.
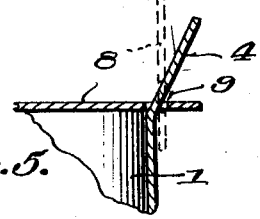
Fig. 5.
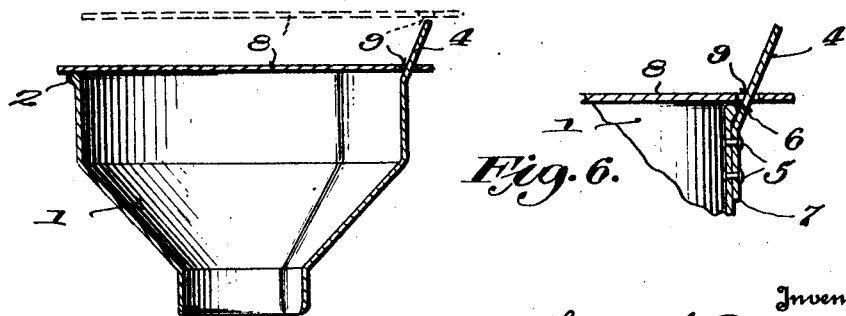
Fig. 3.
Fig. 6.
Inventor
Horace S. Fries
By Edward E. Clement
Attorney Patented July 31, 1928.

1,679,122

UNITED STATES PATENT OFFICE.

HORACE S. FRIES, OF MADISON, WISCONSIN.

MILK STRAINER.

Application filed May 14, 1926. Serial No. 109,151.

My invention relates to sanitary utensils, and especially to such appliances as are used in modern dairy practice. The object of the invention is to provide coverage for holding-utensils, strainers, and the like, which may be quickly applied and removed; which will have no creases or bends in which material might remain and bacteria might colonize; which nevertheless will be efficient for its purpose, affording protection from dust and other contamination; which on occasion can be opened without detaching it from the vessel to which it is applied; and finally which can be entirely detached from the vessel by simple means and in a limited space. More specifically stated, my invention has to do with covers and hinges for metal milk strainers, and contemplates a cover with nothing but smooth, straight, unbroken surfaces, only one opening in it, which shall be easy to clean, and a cooperating part on the strainer or other utensils constituting the hinge, which shall also consist of nothing but a plane straight surfaced piece of metal, free from cracks or crannies, said hinge enabling the cover to be opened in the usual manner and supporting the same when so opened, also allowing the cover to be removed bodily, without opening in the usual manner, so that it may be operated in a restricted space, and finally serving on occasion as a handle or guide for the utensil or strainer with or without the cover in position.

In order to attain my objects, I make the cover of a plane surfaced flat piece of metal of a heavy enough gage to maintain its shape and stay "in true"; and I make the hinge of a perfectly straight inclined piece of metal forming a projection integral with and extending from one edge of the strainer or other utensil. The hinge piece or "slab" extends through a plain smooth vertical opening or slot formed in one side of the cover, and having such dimensions that the cover may lie flat upon the top of the utensil with free up and down movement on the hinge or slab but no lateral movement; or the cover may be turned through an arc and stood up against the hinge or slab, which serves as a support for the same, or finally the cover may be removed entirely from the utensil by merely lifting it straight up therefrom, to the height of the hinge piece or slab, so that the slot will pass off the latter and the cover may then be removed laterally. This function is particularly valuable when the utensil is on a shelf and it is desired to have access to it for any purpose, or when the utensil is to be inserted under a delivery spout or the like, and there is not room to swing the cover upward through a large arc in the ordinary way.

My invention is illustrated in the accompanying drawings, in which

Fig. 1 is a side view of a dairy utensil with my invention applied thereto.

Fig. 2 is a plan view thereof.

Fig. 3 is a sectional view on the line 3—3 of Fig. 2.

Fig. 4 is a side view looking in the direction of the arrow in Fig. 3.

Fig. 5 is a fragmentary section view also on the line 3—3 of Fig. 2, but showing the lid turned up on the hinge into a vertical position.

Fig. 6 is a fragmentary sectional view showing the hinge formed as a separate part and secured to the utensil so as to become integral therewith.

Referring to the drawings, while my invention may be employed with a variety of utensils, I have shown it in the figures applied to a milk strainer 1, circular in horizontal section, and having a flush top edge provided all around with a bead 2. On one side the vertical wall 3 of the strainer 1 is provided with a flat integral projection 4 forming the hinge or slab already referred to. This projecting hinge or slab is preferably integral with the body of the utensil as shown, but it may be made as a separate unit and secured to the body of an existing utensil as indicated in Fig. 6, where the slab 4 has its lower end bent at an obtuse angle with its body secured to the vertical wall 3 of utensil 1 so as to become integral therewith. When such construction is adopted, in order to realize the full benefits of my invention, it is necessary to fill up all possible crannies and channels with solder or similar material as indicated at 6 and 7 in Fig. 6. Such construction is obviously inferior to that in which the hinge or slab is made integral with the body 3.

To cooperate with this hinge or slab 4 I provide a cover 8 consisting of a flat plane faced sheet of metal of sufficiently heavy gauge to hold its shape and lie closely to the beaded edge 2 all around. It is to be observed that unlike an ordinary hinge, free vertical movement of the cover 8 upon my hinge is possible, hence the cover will adjust itself to the top edge of any utensil provided such edge lies in a true plane, and without regard to whether said plane is true with respect to said hinge or other portions of the utensil. In one side of the cover, and lying transversely to a radius of the same, I form a longitudinal slot 9 of such dimensions as to fit over the slab 4 with just enough clearance to allow the cover free vertical motion thereof, but fitting closely enough to prevent any substantial lateral movement of the cover in any direction. The angle of the slab 4 and the width of the slot 9 are so adjusted that when desired the cover 8 may be turned up vertically as indicated in Fig. 5, the cover then remaining back against the slab as a hinge and stop combined. It will be noted that in Fig. 2 the slot 9 is shown as having its inner edge forming a chord of an arc of the circumferential circle of the cover, an extension 10 of the latter being formed on the cover to make this possible. The simplicity of the parts makes it possible to secure mathematical accuracy in their formation and their operation and for their purpose they function therefore perfectly.

When it is undesirable to swing the lid or cover 8 upward as shown in Fig. 5, or when by reason of restricted space such movement is impossible, the cover may be removed as indicated in Fig. 3, by simply lifting it until its slot 9 passes off the slab 4, when the entire cover may be removed laterally from over the utensil. This is a peculiarly valuable property in a dairy where there are many utensils in a small compass, usually on shelves. It permits access to be had to any utensil at any time without removing it from the shelf; and a utensil may be inserted beneath a delivery spout or the like without exposing it in the meantime to contamination, and the lid may be removed during the filling, and immediately replaced in the same manner indicated in Fig. 3 when the filling is complete.

I am aware that it is not new to provide detachable covers for various kinds of utensils, and I do not claim the same broadly, but I believe it is novel and original with me to provide a connection between a cover and a utensil which is germ proof, which will function as an ordinary hinge, as a steady piece or guide, as a gravity actuated limit stop, and as a hinge having two parts only which are separable without swinging either part and in a very restricted space. I shall claim all these and other features which sufficiently appear from the foregoing description, and wish it to be understood that various changes may be made as to shape, dimensions, materials, etc. without departing from my invention. Thus the meeting surfaces of the cover 8 and the bead or edge 2 of the utensil 1 may be made of any desired shape or configuration, provided they register and cooperate with each other as described. Similarly, the slab 4 and the slot 9 are subject to such modification as may be required by the character and shape of the vessel and cover, provided the principles laid down are not departed from. I have described the best form in which I have yet found it possible to incorporate my invention, but this is for the purpose of definition and not of limitation. I contemplate all such changes and modifications as fairly fall within the scope of the appended claims.

What I claim is:

1. The combination with a utensil of the class described having an open mouth, of a flat cover having smooth straight unbroken surfaces only adapted to engage the edges of said mouth in a horizontal plane only, and a straight piece having plane surfaces only projecting from one of the walls of said utensil and engaging and extending through a straight edged opening in said cover to prevent lateral displacement thereof in any direction.

2. The combination of a utensil and cover as described in claim 1, said cover having a slot in one edge formed as a chord of a circle concentric with its periphery, and a straight hinge or slab formed integral with the wall of the utensil but inclined outwardly at an obtuse angle thereto, and passing through said slot in the cover.

In testimony whereof I hereunto affix my signature.

HORACE S. FRIES.